(12) United States Patent
Bauers et al.

(10) Patent No.: US 9,074,080 B2
(45) Date of Patent: Jul. 7, 2015

(54) LOW-PROFILE ADDITIVES ON THE BASIS OF RENEWABLE RESOURCES

(75) Inventors: Florian Bauers, Burghausen (DE); Michael Tobias Zarka, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/697,496

(22) PCT Filed: May 9, 2011

(86) PCT No.: PCT/EP2011/057371
§ 371 (c)(1),
(2), (4) Date: Nov. 12, 2012

(87) PCT Pub. No.: WO2011/141398
PCT Pub. Date: Nov. 17, 2011

(65) Prior Publication Data
US 2013/0144002 A1     Jun. 6, 2013

(30) Foreign Application Priority Data

May 12, 2010    (DE) .......................... 10 2010 028 952

(51) Int. Cl.
| | | |
|---|---|---|
| C08L 3/06 | (2006.01) |
| C08L 67/06 | (2006.01) |
| C08F 251/00 | (2006.01) |
| C08F 253/00 | (2006.01) |
| C08L 51/02 | (2006.01) |
| C08L 51/04 | (2006.01) |

(52) U.S. Cl.
CPC ................. C08L 3/06 (2013.01); C08F 251/00 (2013.01); C08F 253/00 (2013.01); C08L 51/02 (2013.01); C08L 51/04 (2013.01)

(58) Field of Classification Search
CPC ......... C08L 3/06; C08L 266/18; C08L 67/06; C08L 51/02; C08L 51/04; C08F 251/00; C08F 253/00
USPC .................................................. 524/513, 560
See application file for complete search history.

(56) References Cited

U.S. PATENT DOCUMENTS

| | | | |
|---|---|---|---|
| 3,640,925 A | 2/1972 | Touzinsky et al. | |
| 3,718,714 A | 2/1973 | Comstock et al. | |
| 5,583,193 A | 12/1996 | Aravindakshan et al. | |
| 2006/0003014 A1 | 1/2006 | Jadhav et al. | |
| 2008/0125565 A1* | 5/2008 | Handels et al. ................. | 528/45 |
| 2009/0182090 A1 | 7/2009 | Graewe | |
| 2011/0319547 A1* | 12/2011 | Hashemzadeh et al. ...... | 524/503 |

FOREIGN PATENT DOCUMENTS

| | | | | |
|---|---|---|---|---|
| CN | 1267487 C | | 8/2006 | |
| DE | 27 42 595 A1 | | 4/1979 | |
| DE | 196 19 680 A1 | | 11/1997 | |
| DE | 10 2006 019 686 A1 | | 1/2007 | |
| DE | 10 2009 001 498.5 | * | 3/2009 | |
| GB | 1 116 256 A | | 6/1968 | |
| GB | 2 448 099 A1 | | 10/2008 | |
| GB | 2448099 A | * | 10/2008 | ............. C08L 51/02 |
| JP | 55108402 A | * | 8/1980 | |
| WO | 90/09406 A1 | | 8/1990 | |
| WO | 93/11300 A1 | | 6/1993 | |
| WO | 94/00514 A1 | | 1/1994 | |

OTHER PUBLICATIONS

International Search Report—PCT/EP2011/057371—Jul. 21, 2011.*
Fox T. G., Bull. Am. Physics Soc. 1, 3, p. 123 (1956).
Polymer Handbook 2nd Edition, J. Wiley & Sons, New York (1975).
Simmerl, Reinhold, International Search Report for International Application No. PCT/EP2011/057371 dated Jul. 21, 2011.
English abstract of CN1267487C.

* cited by examiner

*Primary Examiner* — Ling Choi
*Assistant Examiner* — Ronald Grinsted
(74) *Attorney, Agent, or Firm* — RatnerPrestia

(57) ABSTRACT

The invention relates to the use of polymers on the basis of renewable resources as LPA, characterized in that the polymers on the basis of renewable resources can be obtained by the radically initiated polymerization of one or more ethylenically unsaturated monomers in the presence of one or more renewable resources selected from the group consisting of carbohydrates and natural rubbers.

11 Claims, No Drawings

LOW-PROFILE ADDITIVES ON THE BASIS OF RENEWABLE RESOURCES

CROSS REFERENCE TO RELATED APPLICATIONS

This application is the national phase filing of international patent application No. PCT/EP2011/057371, filed 9 May 2011, and claims priority of German patent application number 10 2010 028 952.3, filed 12 May 2010, the entireties of which applications are incorporated herein by reference.

FIELD OF THE INVENTION

The invention relates to the use of polymers based on renewable raw materials as low-profile additives (LPAs), to radically crosslinkable polymer compositions comprising polymers based on renewable raw materials, and to the composite components obtainable by curing said polymer compositions.

BACKGROUND OF THE INVENTION

Composite components are frequently produced using radically crosslinkable polymer compositions based on, for example, unsaturated polyester resins (UP resins). Unsaturated polyester resins are obtainable by polycondensation of dicarboxylic acids or dicarboxylic anhydrides, some of which at least carry ethylenically unsaturated groups, with polyols. The radically crosslinkable polymer compositions further comprise monomers having ethylenically unsaturated groups, generally styrene. Styrene is added to the radically crosslinkable polymer compositions, for example, in order to dissolve the crosslinkable polymers and to ensure that the radically crosslinkable polymer compositions are fluid materials. As further constituents, the radically crosslinkable polymer compositions often further comprise fiber materials such as glass fibers, carbon fibers or corresponding fiber mats (Fiber Reinforcing Plastic composites=FPR composites), which lead to reinforcement of the composite components obtainable by curing the radically crosslinkable polymer compositions.

A problem associated with the processing of such radically crosslinkable polymer compositions to composite components is the volume contraction in the course of curing of the polymer compositions. In order to reduce the contraction that accompanies curing, therefore, additives known as low-profile additives (LPAs) are added to the radically crosslinkable polymer compositions. Low-profile additives reduce the contraction on curing, relieve inherent stresses, reduce the formation of microcracks, and facilitate compliance with manufacturing tolerances. The low-profile additives are typically thermoplastics such as polystyrene, polymethyl methacrylate, and, more particularly, polyvinyl acetate, and frequently also contain carboxyl-functional comonomer units. Thus, for example, U.S. Pat. No. 3,718,714 or DE-A 102006019686 recommend copolymers based on vinyl acetate and ethylenically unsaturated carboxylic acids as LPAs for the production of composite components based on unsaturated polyester resins.

Conventional LPAs hence consist of petrochemical products. Increasingly, however, LPAs based on renewable raw materials are being called for. Nevertheless, many of the existing products based on renewable raw materials are expensive, incompatible with ethylenically unsaturated monomers, such as styrene, or show no LPA effect.

Against this background, the object was to provide polymers based on renewable raw materials which act as low-profile additives (LPAs) but do not have the aforementioned disadvantages. The LPAs, furthermore, ought if possible to lead to composite components having performance properties, such as mechanical properties, for example, like those also achieved with conventional LPAs.

The object has been achieved, surprisingly, through use of polymers based on renewable raw materials, obtained by radically initiated polymerization of ethylenically unsaturated monomers in the presence of renewable raw materials selected from the group encompassing carbohydrates and natural rubbers.

Polymers based on ethylenically unsaturated monomers and renewable raw materials are known per se, as described for example in DE-A 2742595, U.S. Pat. No. 3,640,925, WO 90/09406, WO 94/00514, DE-A 19619680, U.S. Pat. No. 5,583,193, US 2006/0003014 or WO 93/11300. Not known, in contrast, is the use of such polymers as LPAs.

SUMMARY OF THE INVENTION

The invention provides for the use of polymers based on renewable raw materials as LPAs, characterized in that the polymers based on renewable raw materials are obtainable by radically initiated polymerization of one or more ethylenically unsaturated monomers in the presence of one or more renewable raw materials selected from the group encompassing carbohydrates and natural rubbers.

DETAILED DESCRIPTION OF THE INVENTION

Examples of suitable ethylenically unsaturated monomers are one or more monomers from the group encompassing vinyl esters, (meth)acrylic esters, vinylaromatics, olefins, 1,3-dienes, and vinyl halides, and optionally further monomers copolymerizable therewith.

Suitable vinyl esters are, for example, those of carboxylic acids having 1 to 15 C atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, examples being VeoVa9$^R$ or VeoVa10$^R$ (trade names of the company Resolution). Particularly preferred is vinyl acetate.

Suitable monomers from the group of acrylic esters or methacrylic esters are, for example, esters of unbranched or branched alcohols having 1 to 20 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, and 2-ethylhexyl acrylate. Particularly preferred are methyl acrylate, methyl methacrylate, n-butyl acrylate, tert-butyl acrylate, and 2-ethylhexyl acrylate.

Preferred vinylaromatics are styrene, methylstyrene, and vinyl toluene. A preferred vinyl halide is vinyl chloride. The preferred olefins are ethylene and propylene, and the preferred dienes are 1,3-butadiene and isoprene.

Optionally it is also possible for 0.1% to 20% by weight, based on the total weight of the monomer mixture, of auxiliary monomers to be copolymerized. It is preferred to use 0.5% to 10% by weight of auxiliary monomers. Examples of auxiliary monomers are ethylenically unsaturated monocarboxylic and dicarboxylic acids, preferably acrylic acid, methacrylic acid, crotonic acid, fumaric acid, and maleic acid; ethylenically unsaturated anhydrides, preferably maleic anhydride; ethylenically unsaturated carboxamides and carbonitriles, preferably acrylamide and acrylonitrile; monoesters and diesters of fumaric acid and maleic acid such as the diethyl esters and diisopropyl esters; ethylenically unsaturated sulfonic acids and/or their salts, preferably vinylsulfonic acid and 2-acrylamido-2-methylpropanesulfonic acid. Further examples are precrosslinking comonomers such as polyethylenically unsaturated comonomers, examples being diallyl phthalate, divinyl adipate, diallyl maleate, allyl methacrylate or triallyl cyanurate, or postcrosslinking comonomers, examples being acrylamidoglycolic acid (AGA), methacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)-silanes, vinyltrialkoxysilanes, and vinylmethyldialkoxysilanes, with alkoxy groups that may be present being ethoxy and ethoxypropylene glycol ether radicals, for example. Mention may also be made of monomers with hydroxyl or CO groups, examples being hydroxyalkyl acrylates and methacrylates such as hydroxyethyl, hydroxypropyl or hydroxybutyl acrylate or methacrylate, and also compounds such as diacetoneacrylamide and acetylacetoxyethyl acrylate or methacrylate.

Preferred auxiliary monomers are ethylenically unsaturated monocarboxylic or dicarboxylic acids or their anhydrides. Ethylenically unsaturated monocarboxylic or dicarboxylic acids or their anhydrides are used preferably at 0.1% to 5% by weight, more preferably at 0.2% to 4% by weight, based on the total weight of the ethylenically unsaturated monomers.

Preference is given to polymers based on renewable raw materials that comprise one or more monomer units from the group encompassing vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene. Particularly preferred are polymers based on renewable raw materials which comprise units of vinyl acetate and ethylene; vinyl acetate, a vinyl ester of α-branched monocarboxylic acids having 9 to 11 C atoms, and optionally ethylene; vinyl acetate and one or more monomers from the group of methyl acrylate, methyl methacrylate, ethyl acrylate, propyl acrylate, n-butyl acrylate, 2-ethylhexyl acrylate, and optionally ethylene; methyl (meth)acrylate and one or more monomers from the group encompassing ethyl acrylate, propyl acrylate, n-butyl acrylate, 2-ethylhexyl acrylate, and optionally ethylene; styrene and one or more monomers from the group of methyl acrylate, ethyl acrylate, propyl acrylate, n-butyl acrylate, and 2-ethylhexyl acrylate; 1,3-butadiene and styrene and/or methyl methacrylate and also optionally further acrylic esters; the stated mixtures may optionally further comprise one or more of the abovementioned auxiliary monomers, more particularly ethylenically unsaturated monocarboxylic or dicarboxylic acids or anhydrides thereof, preferably in the amounts stated above.

The monomer selection or the selection of the weight fractions of the comonomers is made such that in general a glass transition temperature Tg of ≤120° C., preferably −40° C. to +80° C., more preferably −20° C. to +50° C. results. The glass transition temperature Tg of the polymers can be determined in a known way by means of differential scanning calorimetry (DSC). The Tg may also be calculated approximately in advance by means of the Fox equation. According to Fox T. G., Bull. Am. Physics Soc. 1, 3, page 123 (1956), it is the case that: $1/Tg = x_1/Tg_1 + x_2/Tg_2 + \ldots + x_n/Tg_n$, where xn is the mass fraction (% by weight/100) of the monomer n, and Tgn is the glass transition temperature, in kelvins, of the homopolymer of the monomer n. Tg values for homopolymers are listed in Polymer Handbook, $2^{nd}$ edition, J. Wiley & Sons, New York (1975).

The renewable raw materials are preferably selected from the group encompassing carbohydrates and natural rubbers. Preferred renewable raw materials are carbohydrates.

Suitable carbohydrates are, for example, sugars, starches, celluloses, and chitins. Preferred carbohydrates are starches. Starch may come from any desired sources, as for example from tubers or roots, such as potatoes, maranta (arrowroot), cassava (tapioca) or sweet potato (batata), cereal seeds, such as wheat, corn, rye, rice, barley, millet, oats, triticale or sorghum, fruits, such as bananas, chestnuts, acorns, peas, beans or other legumes, or pith, such as sago. The starch preferably comes from tubers or roots, such as, more particularly, potatoes or cassava (tapioca), or cereals, such as, more particularly, wheat or corn. The starch may also be recovered from wastes, such as potato residues or potato peel, for example, or may be a mixture thereof. The starch may be used in its natural form, as destructured starch, or as chemically modified starch, in the form for example of hydroxyalkylated starch, oxidized starch, starch esters, starch ethers or crosslinked starch. The chemically modified starches here may be anionic, cationic or nonionic. Preference is given to the use of natural starch.

Suitable natural rubbers are, for example, rubbers from rubber trees, balata, chicle gum, gutta percha or guayule rubber. Preference is given to natural rubbers from rubber trees.

For preparing the polymers based on renewable raw materials, the renewable raw materials are used preferably at 5% to 90% by weight, more preferably at 10% to 60% by weight, even more preferably at 15% to 55% by weight, and most preferably at 20% to 50% by weight, based in each case on the total weight of the polymers based on renewable raw materials. For the preparation of the polymers based on renewable raw materials, the ethylenically unsaturated monomers are used preferably at 10% to 95% by weight, more preferably at 40% to 90% by weight, even more preferably at 45% to 85% by weight, and most preferably at 50% to 80% by weight, based in each case on the total weight of the polymers based on renewable raw materials.

The weight-average molecular weight Mw of the polymers based on renewable raw materials is from 5000 to 10 000 000 g/mol, preferably 10 000 to 1 000 000 g/mol, more preferably 20 000 to 500 000 g/mol (determination by means of gel permeation chromatography against polystyrene standard). Generally speaking, the polymers based on renewable raw materials are graft copolymers of ethylenically unsaturated monomers onto the renewable raw materials.

The preparation of the polymers based on renewable raw materials takes place for example by means of radical suspension polymerization or, preferably, by means of emulsion, solution or bulk polymerization processes of the ethylenically unsaturated monomers in the presence of the renewable raw materials and of radical initiators.

Water is used preferably as solvent. Alternatively an organic solvent or a mixture of one or more organic solvents, or a mixture of one or more organic solvents and water, may be used. Examples of organic solvents are aliphatic alcohols having 1 to 6 C atoms, such as methanol, ethanol, n-propanol or isopropanol; aliphatic esters, such as ethyl acetate and butyl acetate; aliphatic ketones, such as acetone and methyl ethyl ketone; aliphatic polyalkylenediols or diols or ethers thereof, such as poly(propylene glycol), poly(ethylene glycol), propylene glycol or dimethyldipropylene glycol; and aromatic solvents, such as toluene or xylene.

The reaction temperature for the preparation of the polymers based on renewable raw materials is 20° C. to 160° C., preferably from 40° C. to 140° C. Polymerization takes place generally under atmospheric pressure at reflux. Copolymerization of gaseous monomers such as ethylene is operated under pressure, generally between 1 and 100 bar.

Suitable radical initiators are common oil-soluble or water-soluble initiators. Examples of oil-soluble initiators are oil-soluble peroxides, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethylcyclohexane, di(4-tert-butylcyclohexyl) peroxydicarbonate, dilauroyl peroxide, cumyl hydroperoxide, or oil-soluble azo initiators, such as azobisisobutyronitrile or dimethyl 2,2'-azobis(2-methylpropionate). Examples of water-soluble initiators are peroxodisulfates, such as potassium peroxodisulfate, hydrogen peroxide, water-soluble hydroperoxides such as tert-butyl hydroperoxide, manganese(III) salts or cerium(IV) salts. The initiators are used in general in an amount of 0.005% to 3.0% by weight, preferably 0.01% to 1.5% by weight, based in each case on the total weight of the ethylenically unsaturated monomers for preparing the polymers based on renewable raw materials. The use of redox initiators is preferred. Redox initiators used are combinations of the stated initiators in combination with reducing agents. Suitable reducing agents are, for example, sodium sulfite, iron(II) salts, sodium hydroxymethanesulfinate, and ascorbic acid. Preferred redox initiators are cerium(IV) salts, such as ammonium cerium (IV) nitrate, manganese(III) salts or peroxodisulfates, and also combinations of these initiators. Where reducing agents are used, the amount of reducing agent is preferably 0.01% to 0.5% by weight, based on the total weight of the monomers. It is also possible, however, for the renewable raw materials used to act themselves as reducing agents.

The use of redox initiators leads in a particularly advantageous way to the grafting of ethylenically unsaturated monomers onto the renewable raw materials.

The reaction mixture can be stabilized by common emulsifiers or protective colloids. Preferably, however, no emulsifiers or protective colloids are used. With particular preference the amount of emulsifiers and protective colloids is less than 7% by weight and most preferably less than 1% by weight, based on the total weight of the ethylenically unsaturated monomers. Examples of protective colloids are fully hydrolyzed or, in particular, partially hydrolyzed polyvinyl alcohols; polyvinylpyrrolidones; polyvinylacetals; lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine-formaldehyde sulfonates, naphthalene-formaldehyde sulfonates, styrene-maleic acid copolymers, and vinyl ether-maleic acid copolymers. Examples of emulsifiers are anionic, cationic, and nonionic emulsifiers, examples being anionic surfactants, such as alkyl sulfates having a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The polymerization may be carried out with all or some constituents of the reaction mixture being introduced as an initial charge, or with some of all or some constituents of the reaction mixture being included in the initial charge and some metered in subsequently, or by the metering method without an initial charge. The procedure is preferably such that at least part, preferably the total amount, of the renewable raw materials is introduced as an initial charge, optionally in a solvent, more particularly water. The ethylenically unsaturated monomers and the initiators are preferably included wholly or partly in the initial charge, and any remaining amount of ethylenically unsaturated monomers and initiators is metered in. Where a batch process is performed, all of the monomers, renewable raw materials, solvents, and a portion of the initiator are included in the initial charge, and the remaining initiator is added in metered form or in portions.

Where the suspension, emulsion or solution polymerization process is carried out, the polymerization is generally conducted to a solids content of 10% to 90%, preferably to a solids content of 30% to 80%. In this case the polymers based on renewable raw materials are generally present in the form of dispersions.

After the end of the polymerization it is possible to carry out postpolymerization using known methods, for the purpose of removing residual monomers. Volatile residual monomers and other volatile constituents can also be removed by means of distillation or stripping techniques, preferably under reduced pressure.

To isolate the polymers based on renewable raw materials, liquids or solvents that may be present are distilled off preferably under reduced pressure and at temperatures from 50 to 100° C. Polymers in the form of aqueous dispersions may alternatively also be converted into corresponding powders by common drying methods, for example by means of spray drying, fluidized bed drying or freeze drying. In this case it is usual to use a drying aid in a total amount of 3% to 30% by weight, preferably 5% to 20% by weight, based on the polymeric constituents of the dispersion. Preferred drying aids are the aforementioned polyvinyl alcohols. Lastly, the polymers may also be isolated by common filtration methods, more particularly by means of ultrafiltration.

The resulting polymers based on renewable raw materials can be used directly as LPAs.

Additionally provided by the invention are radically crosslinkable polymer compositions comprising one or more radically crosslinkable polymers, one or more ethylenically unsaturated monomers (reactive monomers), optionally initiators, optionally fillers, and optionally further additions, characterized in that additionally one or more polymers based on renewable raw materials selected from the group encompassing carbohydrates and natural rubbers are present.

Reactive monomers that are suitable, preferred, and more preferred, respectively, are the same ethylenically unsaturated monomers also suitable, preferred, and more preferred, respectively, for the polymerization for preparing the polymers based on renewable raw materials. Especially preferred reactive monomers are styrene, methyl methacrylate, methyl acrylate, and butyl acrylate. The most preferred reactive monomer is styrene.

Preferred radically crosslinkable polymers are unsaturated polyester resins or vinyl ester resins.

The unsaturated polyester resins are reaction products of one or more dicarboxylic acids or of one or more dicarboxylic anhydrides, of which at least one carries one or more ethylenically unsaturated groups, with one or more polyols. The preparation of the unsaturated polyester resins is known to the skilled person.

The dicarboxylic acids or the dicarboxylic anhydrides have preferably 2 to 20, more preferably 4 to 20, and most preferably 4 to 10 carbon atoms. The unsaturated polyester resins comprise at least one ethylenically unsaturated dicarboxylic acid or at least one ethylenically unsaturated dicarboxylic anhydride. Preferred ethylenically unsaturated dicarboxylic acids and dicarboxylic anhydrides are maleic acid, maleic anhydride, fumaric acid, methylmaleic acid, and itaconic acid. Particularly preferred are maleic acid, maleic anhydride, and fumaric acid.

In addition to the ethylenically unsaturated dicarboxylic acids or dicarboxylic anhydrides it is possible to use saturated dicarboxylic acids or anhydrides. Suitable saturated acids or dicarboxylic anhydrides are, for example, ortho-phthalic acid, isophthalic acid, phthalic anhydride, terephthalic acid, hexahydrophthalic acid, adipic acid, succinic acid, and isophthalic acid.

Suitable polyols have preferably 2 to 20 and more preferably 2 to 10 carbon atoms. Polyols carry preferably 2 to 3, more preferably 2, alcohol groups. Examples of suitable polyols are ethylene glycol, diethylene glycol, propylene glycol, dipropylene glycol, butylene glycol, neopentyl glycol, glycerol, and 1,1,1-trimethylolpropane.

The unsaturated polyester resins have molecular weights Mw of preferably 500 to 10 000 g/mol, more preferably of 500 to 8000 g/mol, and most preferably of 1000 to 6000 g/mol.

Vinyl ester resins are reaction products which form as a result of polyadditions or esterification reactions of phenol derivatives and ethylenically unsaturated monocarboxylic or dicarboxylic acids or dicarboxylic anhydrides having 3 to 20 carbon atoms, such as, for example, acrylic acids or methacrylic acids. Preferred phenol derivatives are bisphenol A and phenol novolak. The preparation of the vinyl ester resins is known to the skilled person.

Suitable initiators are, for example, tert-butyl perbenzoate, tert-butyl peroxy-2-ethylhexanoate, tert-butyl peroxypivalate, tert-butyl peroxyneodecanoate, dibenzoyl peroxide, tert-amyl peroxypivalate, di(2-ethyl-hexyl) peroxydicarbonate, 1,1-bis(tert-butylperoxy)-3,3,5-trimethylcyclohexane, di(4-tert-butylcyclohexyl) peroxydicarbonate, and azobisisobutyronitrile.

Examples of suitable fillers are talc, aluminum hydroxide, kaolin, calcium carbonate, dolomite, glass beads or glass fibers, quartz, aluminum oxide or barium sulfate.

The radically crosslinkable polymer compositions comprise preferably 30 to 70 parts by weight of radically crosslinkable polymers, 5 to 40 parts by weight of polymers based on renewable raw materials, 20 to 160 parts by weight of reactive monomers, optionally 0.5 to 2 parts by weight of initiator, optionally fillers, such as 25 to 100 parts by weight of glass fibers or 50 to 300 parts by weight of calcium carbonate, optionally further additives such as 0.5 to 3 parts by weight of mold release agents, such as, for example, zinc stearate, and also, optionally, further adjuvants, examples being pigments, thickeners, and flame retardancy additions.

The radically crosslinkable polymer compositions may further comprise additional polymers, such as, for example, polymers known to act as low-profile additives such as polyesters, polystyrene, polyvinyl acetate, carboxyl-functional polyvinyl acetate or polymethyl methacrylate. The fraction of the additional polymers is 0% to 100% by weight, preferably 0% to 50% by weight, more preferably 0% to 10% by weight, based in each case on the amount by weight of polymers based on renewable raw materials in the respective radically crosslinkable polymer composition.

Further provided by the invention are methods for producing the radically crosslinkable polymer compositions by mixing one or more radically cross-linkable polymers, one or more ethylenically unsaturated monomers (reactive monomers), and optionally initiators, optionally fillers, and optionally further additions, characterized in that additionally one or more polymers based on renewable raw materials selected from the group encompassing carbohydrates and natural rubbers are admixed.

The polymers based on renewable raw materials and the radically crosslinkable polymers are dissolved separately or together, optionally in combination with additional polymers, generally in reactive monomers, and optionally mixed with further additives such as fillers, thickeners, initiators, and processing assistants. Where the polymers based on renewable raw materials or the radically crosslinkable polymers are dissolved in reactive monomers, the radically crosslinkable polymers are used preferably as a 50% to 70% strength solution in reactive monomers, and the polymers based on renewable raw materials are used preferably as a 30% to 50% strength solution in reactive monomers.

The mixing of the components for producing the radically crosslinkable polymer compositions may be carried out using the common apparatus known to the skilled person, such as, for example, reactors, stirred tanks or mixers, and stirrers, such as paddle stirrers, anchor stirrers or blade stirrers, for example.

Further provided by the invention are composite components obtainable by curing the radically cross-linkable polymer compositions.

Curing of the radically crosslinkable polymer compositions takes place preferably at temperatures of ≥20° C., more preferably from 20 to 200° C., and most preferably from 20 to 165° C. Curing takes place preferably in the presence of one or more initiators by radically initiated polymerization. The radically crosslinkable polymer compositions on curing at the respective temperature are optionally compressed using pressures of ≥1 mbar, more preferably from 1 to 200 000 mbar, and most preferably from 1000 to 200 000 mbar.

The composite components may be obtained by all common production processes from the radically crosslinkable polymer compositions, such as, for example, by means of sheet molding compound technology (SMC), bulk molding compound technology (BMC), resin transfer molding (RTM) or resin injection molding (RIM).

The composite components are produced preferably by the BMC (bulk molding compound) or SMC (sheet molding compound) technology.

In the case of the BMC process, the solutions of the radically crosslinkable polymers in reactive monomer, and the polymers based on renewable raw materials, and optionally the further components such as the initiator, filler, mold release agent or additional polymers, low-profile additives or adjuvants, are mixed to a pastelike mass, after which glass fibers, optionally, are mixed in, and then the resultant radically crosslinkable polymer compositions are cured to composite components using pressure and temperature. This technology is used, for example, to produce reflectors for automobile headlights.

In the case of the SMC process, similarly to the BMC process, a radically crosslinkable polymer composition in the form of a pastelike mass is produced from a solution of the radically crosslinkable polymers in reactive monomer and from the polymer based on renewable raw materials, and optionally the further components such as initiator, filler, mold release agent, additional polymers or adjuvants, and is applied to two carrier films. Chopped glass fiber rovings are then scattered onto one of the two layers, and finally both carrier films are united with one another, causing the layers produced to come into mutual contact. This is followed by compacting by means of a system of rollers. The resulting sheetlike SMC compound is then rolled up and stored for at least three days under defined conditions, this process being termed maturing. Finally, the sheetlike sandwich is peeled from the film and cut into pieces, and is pressed to form moldings with application of pressure and temperature. Composite components obtainable in this way are used, for example, as tailgates of automobiles.

The polymers of the invention based on renewable raw materials surprisingly exhibit a low-profile additive activity which is comparable with that of conventional low-profile additives based on purely petrochemical products. In the same way as conventional LPAs, the polymers based on renewable raw materials can be used in methods for producing composite components; in particular, the polymers based on renewable raw materials are very readily soluble in reactive monomers, such as styrene. The polymers based on renewable raw materials also lead to composite components having the desired performance properties, such as mechanical properties, for example.

The examples below serve for further elucidation of the invention, without in any way restricting said invention.
Preparation of the Polymers Based on Renewable Raw Materials:

EXAMPLE 1

20 g of potato starch (Kartoffelstärke superior, Emsland-Group, Germany) were dissolved in 380 g of water in a 1 l glass reactor with anchor stirring at 60° C. This clear solution was subsequently admixed while stirring with 180 g of vinyl acetate and also 0.3 g of ammonium cerium(IV) nitrate. A solution of 1.2 g of ammonium cerium(IV) nitrate in 20 g of water was metered in over three hours. After a total of five hours at 60° C., the resulting dispersion was dried by vacuum distillation. Prior to the distillation, the solids content of the dispersion was 33%, corresponding to a conversion of 98.5%.

EXAMPLE 2

The procedure of example 1 was repeated, but using 60 g of potato starch and 140 g of vinyl acetate (conversion: 99.5%). The preparation of the potato starch solution in water and the polymerization took place at 65° C. rather than 60° C. The dispersion was dried by spray drying. The resulting powder formed a full, 40% strength by weight solution in styrene. In the IR spectrum of the polymerization product there were the characteristic bands for poly(vinyl acetate), at 1720 $cm^{-1}$ and 1225 $cm^{-1}$, for example, and starch, at 3272 $cm^{-1}$ and 762 $cm^{-1}$, for example.

EXAMPLE 3

The procedure of example 1 was repeated, but using 100 g of potato starch, 400 g of water, and 100 g of vinyl acetate (conversion: 99.2%).

EXAMPLE 4

In a laboratory kneading apparatus, 150 g of potato starch were combined with 300 g of vinyl acetate and 5 g of crotonic acid at 65° C. The doughy mass obtained was admixed with a solution of 1 g of ammonium cerium(IV) nitrate in 45 g of vinyl acetate. Kneading was then continued at 65° C. for 4 hours. The volatile fractions (about 1.0 g) were removed by distillation. The resulting powder formed a full, 40% strength by weight solution in styrene. In the IR spectrum of the polymerization product there were the characteristic bands for poly(vinyl acetate) and starch.

EXAMPLE 5

The procedure of example 2 was repeated, but using 120 g of vinyl acetate, 18 g of methyl methacrylate, and 2 g of methacrylic acid as ethylenically unsaturated monomers, and carrying out the reaction at 50° C. (conversion: 99%). The resulting powder formed a full, 40% strength by weight solution in styrene.

EXAMPLE 6

40 g of potato starch ether (Emcol F1796, Emsland-Group, Germany) were dissolved in 350 g of water at 65° C. This clear solution was then admixed over a period of 3 hours, while stirring, with 140 g of vinyl acetate and also 20 g of methyl methacrylate. In parallel with this a solution of 0.3 g of ammonium cerium(IV) nitrate in 5 g of water and a solution of 1.5 g of potassium peroxodisulfate in 45 g of water were metered in over a period of 4 hours. After a total of 6 hours, the resulting dispersion (conversion: 99.9%) was dried by vacuum distillation.

EXAMPLE 7

In a laboratory kneading apparatus, 90 g of anionic corn starch (Emprint CE, Emsland-Group, Germany) were combined with 100 g of methyl methacrylate and 20 g of methyl acrylate at 50° C. The doughy mass obtained was admixed with a solution of 1 g of ammonium cerium(IV) nitrate in 20 g of methyl methacrylate over a period of 2 hours. Kneading was then continued at 65° C. for 4 hours. The volatile fractions (about 1 g) were removed by distillation.

EXAMPLE 8

The procedure of example 2 was repeated, but using 138 g of styrene instead of 140 g of vinyl acetate. The reaction took place at 55° C. In addition, 2 g of maleic anhydride were metered, from a reservoir heated at 55° C., over a period of 2 hours. The resulting powder formed a full, 40% strength by weight solution in styrene. In the IR spectrum of the polymerization product there were the characteristic bands for poly(vinylbenzene) and starch.

Since the polymerization products formed full solutions in styrene, it is clearly evident that the starches were grafted quantitatively with ethylenically unsaturated monomers and that there was no longer any free starch present, since free starch is virtually insoluble in styrene.

Production of Composite Components by the BMC Method:
First of all the UP resin and the additives in accordance with the indications in table 1, apart from the glass fibers and filler (calcium carbonate Millicarb OG), were premixed in a container for 2 minutes using a dissolver (resin paste). In a second step, this resin paste was mixed with the glass fibers and the calcium carbonate for 10 minutes in a small laboratory kneading apparatus.

The BMC (bulk molding compound) compound was then placed in packaging impervious to styrene, using suitable films, and stored at 23° C. for 2 days (aging time), after which it was inserted into a Wickert press (pressing conditions: 3 minutes, 160° C., 730 kN pressing force, 3 mm plate thickness).

TABLE 1

Formula for producing the composite components:

| Components | [g] |
|---|---|
| Palapreg P 18-03 (UP resin)[a] | 60 |
| LPA [40% strength in styrene][g] | 40 |
| Trigonox C (peroxide)[b] | 1.5 |
| Luvatol MK 35[c] (thickening paste) | 3 |
| Calcium stearate (lubricant) | 4 |
| PBQ[d] (inhibitor) | 0.3 |
| Millicarb OG[e] (filler) | 270 |
| Hydroquinone (stabilizer) | 0.03 |
| Cratec 163D-14C[f] (glass fibers, 4 mm length)) | 43.2 |

[a]Trade name of DSM
[b]Trade name of Akzo
[c]Trade name of Lehmann & Voss & Co
[d]p-Hydroquinone in the form of 10% strength by weight solution of methyl methacrylate.
[e]Trade name of Omya GmbH
[f]Trade name of Owens Corning
[g]see indications in tables 2 and 3.

Testing of the Composite Components

After cooling to room temperature, the resulting BMC plates were tested as follows:
for the characterization of the mechanical properties, flexural modulus of elasticity and flexural strength were determined in accordance with DIN EN ISO 14125;
contraction values (linear contraction): volume change was determined by measurement and expressed as percentages.
For the quantitative assessment of the surface quality, gloss, longwave, and shortwave were determined using instruments from Byk-Gardner.

The results of the testing of the inventive LPAs of examples 1-8 are set out in table 2. The results for noninventive, comparative examples are summarized in table 3.

TABLE 2

Results of testing of inventive composite components:

| | Example | | | | | | | |
|---|---|---|---|---|---|---|---|---|
| | 9 | 10 | 11 | 12 | 13 | 14 | 15 | 16 |
| LPA from example | 1 | 2 | 3 | 4 | 5 | 6 | 7 | 8 |
| Linear contraction [%] | 0.04 | 0.0 | 0.08 | 0.03 | 0.04 | 0.02 | 0.09 | 0.10 |
| Flexural elasticity modulus [MPa] | 13 000 | 12 500 | 12 000 | 15 000 | 14 000 | 12 500 | 13 000 | 12 000 |
| Flexural strength [MPa] | 61 | 65 | 55 | 60 | 79 | 64 | 70 | 55 |
| Gloss[1] | 70 | 77 | 75 | 83 | 82 | 80 | 73 | 75 |
| Longwave[2] | 1.7 | 1.5 | 2.0 | 1.4 | 1.3 | 1.5 | 2.0 | 2.1 |
| Shortwave[2] | 7.6 | 8.0 | 7.3 | 8.8 | 9.2 | 7.6 | 7.1 | 6.2 |

[1]Determined using the Byk-Gardner micro-haze plus instrument
[2]Determined using the Byk-Gardner micro-wave scan instrument

TABLE 3

Results of testing of noninventive composite components:

| | Comparative example | | |
|---|---|---|---|
| | 17 | 18 | 19 |
| LPA | C 501[a] | Kartoffelstärke superior[b] | Kartoffelstärke superior[b] and C 501[a] (in a weight ratio of 1:1) |
| Linear contraction [%] | 0.02 | 0.40 | 0.20 |
| Flexural elasticity modulus [MPa] | 13 500 | 15 000 | 14 000 |
| Flexural strength [MPa] | 60 | 81 | 70 |
| Gloss[1] | 82.3 | n.m.[3] | n.m.[3] |
| Longwave[2] | 1.2 | n.m.[3] | n.m.[3] |
| Shortwave[2] | 9.5 | n.m.[3] | n.m.[3] |

[a]VINNAPAS ® C501, trade name of Wacker Chemie AG
[b]Potato starch, trade name of Emsland-Stärke GmbH
[1]Determined using the Byk-Gardner micro-haze plus instrument
[2]Determined using the Byk-Gardner micro-wave scan instrument
[3]n.m. = not measurable since surface quality too poor From table 2 it is evident that the polymers used in accordance with the invention, based on the renewable raw materials, are, surprisingly, highly active LPAs. The comparison of the results of table 2 and with comparative example 17 (table 3) illustrates that with the polymers of the invention in fact a similar contraction-reducing effect and similar performance properties are achieved as with a polymer hitherto commonly employed as a LPA.

The invention claimed is:
1. A radically crosslinkable polymer composition comprising one or more radically crosslinkable polymers selected from unsaturated polyester resins and vinyl ester resins, one or more of a first ethylenically unsaturated monomers, optionally initiators, optionally fillers, and optionally further additions, wherein additionally one or more polymers based on renewable raw materials are present, the one or more polymers based on renewable materials obtained by radically initiated polymerization of one or more of a second ethylenically unsaturated monomer in the presence of at least one of carbohydrates and natural rubbers, wherein the one or more of a second ethylenically unsaturated monomer is selected from the group consisting of vinyl esters, vinylaromatics, olefins, 1,3-dienes, vinyl halides, methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate and optionally further monomers copolmerizable therewith, the further monomers copolymerizable therewith are selected from the group consisting of ethylenically unsaturated monocarboxylic and dicarboxylic acids; ethylenically unsaturated anhydrides; ethylenically unsaturated carboxamides and carbonitriles; monoesters and diesters of fumaric acid and maleic acid; ethylenically unsaturated sulfonic acids and/or their salts; diallyl phthalate; divinyl adipate; diallyl maleate; allyl methacylate; triallyl cyanurate; acrylamidoglycolic acid; methacrylamidoglycolic acid methyl ester; N-methylolacrylamide; N-methlolmethacrylamide; N-methylolallylcarbarnate; isobutoxy ether or esters and of N-methylolacrylamide; of N-methylolmethacrylamide, and of N-methylolallylcarbarnate; epoxide-functional comonomers: silicon-functional comonomers; hydroxyethyl, hydroxypropyl or hydroxybutyl acrylate or methacrylate; diacetoneacrylamide; and acetylacetoxyethyl acrylate or methacrylate.

2. A process for producing the radically crosslinkable polymer composition as claimed in claim 1, comprising mixing the one or more radically crosslinkable polymers selected from unsaturated polyester resins and vinyl ester resins, one or more of the first ethylenically unsaturated monomers, and optionally the initiators, optionally the fillers, and optionally the further additions, wherein additionally the one or more polymers based on renewable raw materials are admixed.

3. A composite component obtained by curing the radically crosslinkable polymer composition as claimed in claim 1.

4. The radically crosslinkable composition as claimed in claim 1, wherein the polymers based on renewable raw materials comprise one or more monomer units from the group consisting of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene.

5. The radically crosslinkable composition of claim 1, wherein the carbohydrates are selected from the group consisting of sugars, starches, celluloses, and chitins.

6. The radically crosslinkable composition as claimed in claim 5, wherein the one or more renewable raw materials comprise starch from the group consisting of tubers, roots, cereal seeds, fruits, chestnuts, acorns, legumes and pith.

7. The radically crosslinkable composition of claim 1, wherein the polymers based on renewable raw materials contain 5% to 90% by weight of units from renewable raw materials, based on the total weight of the polymers based on renewable raw materials.

8. The radically crosslinkable composition of claim 1, wherein the polymers based on renewable raw materials contain 10% to 95% by weight of units from one or more of the second ethylenically unsaturated monomers, based on the total weight of the polymers based on renewable raw materials.

9. The radically crosslinkable composition of claim 1, wherein the polymers based on renewable raw materials are graft copolymers of one or more of the second ethylenically unsaturated monomers onto the renewable raw materials.

10. The radically crosslinkable composition as claimed in claim 1, wherein:

the unsaturated polyester resins are reaction products of one or more dicarboxylic acids or of one or more dicarboxylic anhydrides, of which at least one carries one nr more ethylenically unsaturated groups, with one or more polyols; and the vinyl ester resins are reaction products which form as a result of polyadditions or esterification reactions of phenol derivatives and ethylenically unsaturated monocarboxylic or dicarboxylic acids or dicarboxylic anhydrides having 3 to 20 carbon.

11. The process as claimed in claim 2, wherein:

the unsaturated polyester resins are reaction products of one or more dicarboxylic acids or of one or more dicarboxylic anhydrides, of which at least one carries one or more ethylenically unsaturated groups, with one or more polyols; and the vinyl ester resins are reaction products which form as a result of polyadditions or esterification reactions of phenol derivatives and ethylenically unsaturated monocarboxylic or dicarboxylic acids or dicarboxylic anhydrides having 3 to 20 carbon.

\* \* \* \* \*